(12) United States Patent
Fei et al.

(10) Patent No.: US 12,088,527 B2
(45) Date of Patent: Sep. 10, 2024

(54) COMMUNICATION METHOD AND APPARATUS

(71) Applicant: HUAWEI TECHNOLOGIES CO., LTD., Shenzhen (CN)

(72) Inventors: Yongqiang Fei, Shenzhen (CN); Xinqian Xie, Beijing (CN); Zhiheng Guo, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 17/562,722

(22) Filed: Dec. 27, 2021

(65) Prior Publication Data

US 2022/0123903 A1 Apr. 21, 2022

Related U.S. Application Data

(63) Continuation of application No. PCT/CN2020/098287, filed on Jun. 24, 2020.

(30) Foreign Application Priority Data

Jun. 28, 2019 (CN) .......................... 201910579194.8

(51) Int. Cl.
*H04W 72/04* (2023.01)
*H04L 5/00* (2006.01)
*H04W 72/12* (2023.01)

(52) U.S. Cl.
CPC .................................. *H04L 5/0053* (2013.01)

(58) Field of Classification Search
None
See application file for complete search history.

(56) References Cited

U.S. PATENT DOCUMENTS 10,405,331 B2 * 9/2019 Xiong .................. H04W 76/16
2014/0016475 A1 * 1/2014 Zhou .................... H04W 72/569
370/236

(Continued)

FOREIGN PATENT DOCUMENTS

CN 102685707 A 9/2012
CN 107809305 A 3/2018

(Continued)

OTHER PUBLICATIONS

"3rd Generation Partnership Project; Technical Specification Group Radio Access Network; Study on New Radio Access Technology (Release 14)," 3GPP TR 38.912 V0.1.0, R1-1700591, total 24 pages, 3rd Generation Partnership Project, Valbonne, France (Jan. 2017).

*Primary Examiner* — Sai Aung
(74) *Attorney, Agent, or Firm* — Leydig, Voit & Mayer, Ltd.

(57) ABSTRACT

A communication method and apparatus are provided. A terminal device determines a first transmission time period and a second transmission time period, where the first transmission time period includes X1 time units, the second transmission time period includes X2 time units, and the first transmission time period does not overlap the second transmission time period. The terminal device sends a first reference signal in the first transmission time period and a first uplink signal in the second transmission time period, where the first uplink signal includes at least one of a physical uplink shared channel (PUSCH), a physical uplink control channel (PUCCH), or a demodulation reference signal (DMRS). Therefore, the terminal device may additionally send the first reference signal, to improve uplink channel estimation performance of a network device. This (Continued)

improves coverage performance of a communication system.

19 Claims, 10 Drawing Sheets

(56) References Cited

U.S. PATENT DOCUMENTS

| | | | | |
|---|---|---|---|---|
| 2018/0278393 A1* | 9/2018 | Akula | ................. | H04W 72/569 |
| 2018/0338306 A1* | 11/2018 | Wu | ....................... | H04W 72/21 |
| 2019/0090276 A1 | 3/2019 | Lee et al. | | |
| 2019/0342037 A1* | 11/2019 | Karaki | ................. | H04W 72/04 |
| 2020/0205084 A1* | 6/2020 | Chen | .................... | H04W 52/10 |
| 2021/0282170 A1* | 9/2021 | Falconetti | ............. | H04W 72/20 |

FOREIGN PATENT DOCUMENTS

| | | | |
|---|---|---|---|
| CN | 109392104 A | 2/2019 | |
| CN | 109495231 A | 3/2019 | |
| CN | 109644466 A | 4/2019 | |
| EP | 3236610 A1 | 10/2017 | |
| WO | 2018064313 A1 | 4/2018 | |
| WO | 2019033302 A1 | 2/2019 | |

\* cited by examiner

COMMUNICATION METHOD AND APPARATUS

CROSS-REFERENCE TO RELATED APPLICATIONS

This application is a continuation of International Application No. PCT/CN2020/098287, filed on Jun. 24, 2020, which claims priority to Chinese Patent Application No. 201910579194.8, filed on Jun. 28, 2019. The disclosures of the aforementioned applications are hereby incorporated by reference in their entireties.

TECHNICAL FIELD

This application relates to the field of communication technologies, and in particular, to a communication method and apparatus.

BACKGROUND

In some deep-coverage scenarios, for example, a cell edge or a basement, a path loss of a wireless signal is very severe in wireless communication. In this case, a coverage enhancement means needs to be considered, and it is particularly important to improve coverage performance for uplink transmission. A reason is: A transmit power of a terminal device is usually low, for example, is 23 dBm, and is far lower than a transmit power of a network device (for example, a typical transmit power of a gNodeB (gNB) with a bandwidth of 20 MHz is 46 dBm). Particularly, in some deep-coverage scenarios, uplink channel estimation performance of the network device is poor, and inaccurate uplink channel estimation severely affects demodulation that is performed by the network device on uplink data sent by the terminal device. As a result, the network device may fail to correctly receive an uplink signal sent by the terminal device. Therefore, improving the uplink channel estimation performance of the network device is a feasible means of improving the coverage performance for the uplink transmission.

Currently, in a new radio (NR) system, a gNB performs uplink channel estimation mainly by using a demodulation reference signal (demodulation reference signal, DMRS). For example, a user equipment (UE) sends a physical uplink shared channel (PUSCH) in a slot. One slot usually includes 14 orthogonal frequency division multiplexing (OFDM) symbols. The UE may select one or more OFDM symbols such as the third OFDM symbol in FIG. 1 from the first OFDM symbol to the fourth OFDM symbol in the 14 OFDM symbols to send the DMRS, and send uplink data on the remaining OFDM symbols.

FIG. 1 is a schematic diagram in which a gNB sends downlink control information (DCI) to schedule a UE to transmit a PUSCH. On which OFDM symbols the UE sends a DMRS depends on configuration performed by the gNB on the UE. In addition to using the DCI to schedule transmission, a configured grant (or referred to as "grant free") method may be further used in NR. Specifically, the gNB configures a transmission resource for the UE by using radio resource control (RRC) signaling, and the UE determines, based on whether the UE itself has a data service, whether to perform uplink transmission. However, in both transmission dynamically scheduled by using the DCI and configured grant transmission, uplink data and the DMRS are always sent together, and a quantity of OFDM symbols on which the DMRS can be sent and locations of the OFDM symbols in a slot are determined immediately after semi-persistent configuration is performed. A ratio of a quantity of OFDM symbols occupied by the uplink data to the quantity of OFDM symbols occupied by the DMRS is relatively fixed. Therefore, in some deep-coverage scenarios, uplink channel estimation performance of the gNB is poor. As a result, the gNB may fail to correctly receive the uplink signal sent by the UE.

SUMMARY

Embodiments of this application provide a communication method and apparatus, to improve uplink channel estimation performance of a network device.

According to a first aspect, an embodiment of this application provides a communication method. The method includes: A terminal device determines a first transmission time period and a second transmission time period, sends a first reference signal in the first transmission time period, and sends a first uplink signal in the second transmission time period, where the first transmission time period includes X1 time units, the second transmission time period includes X2 time units, the first transmission time period does not overlap the second transmission time period, X1 is a positive integer, X2 is a positive integer, and the first uplink signal includes at least one of a PUSCH, a PUCCH, or a DMRS.

According to the foregoing design, the terminal device may additionally send the first reference signal, to improve uplink channel estimation performance of a network device. This improves coverage performance of a communication system.

In a possible design, a method used by the terminal device to determine the first transmission time period may include but is not limited to the following:

The terminal device determines the first transmission time period based on first indication information, where the first indication information indicates information about a ratio of a quantity of time units included in the first transmission time period to a quantity of time units included in the second transmission time period, or the first indication information indicates a quantity of time units included in the first transmission time period.

In a possible design, a method used by the terminal device to determine the first transmission time period may include but is not limited to the following: The terminal device determines the first transmission time period based on the second transmission time period and the information that is indicated by the first indication information and that is about the ratio of the quantity of time units included in the first transmission time period to the quantity of time units included in the second transmission time period, or the terminal device determines the first transmission time period based on the second transmission time period and the quantity that is indicated by the first indication information and that is of time units included in the first transmission time period.

In a possible design, a method used by the terminal device to determine the first transmission time period may include but is not limited to the following: The terminal device determines the first transmission time period based on a third transmission time period and the information that is indicated by the first indication information and that is about the ratio of the quantity of time units included in the first transmission time period to the quantity of time units included in the second transmission time period, or the terminal device determines the first transmission time period based on a third transmission time period and the quantity that is indicated by the first indication information and that is of time units included in the first transmission time period, where the third transmission time period includes the first transmission time period and the second transmission time period.

According to the foregoing designs, the terminal device determines the first transmission time period in a plurality of different possible manners.

In a possible design, in the first transmission time period and the second transmission time period, every N1+N2 consecutive time units include N1 consecutive time units that are included in the first transmission time period and N2 consecutive time units that are included in the second transmission time period, where N1 is a positive integer less than or equal to X1, and N2 is a positive integer less than or equal to X2.

According to the foregoing design, the time unit included in the first transmission time period and the time unit included in the second transmission time period can be distributed as alternately as possible. The network device may perform, by using the first reference signal in different time units, interpolation estimation on a channel that is occupied by the first uplink signal separated by the first reference signal. This design is applicable to a case in which the terminal device moves at a high speed and a channel changes rapidly.

In a possible design, N1 is a quotient of X1 divided by Z, N2 is a quotient of X2 divided by Z, and Z is a greatest common divisor of X1 and X2.

According to the foregoing design, the first uplink signal and the first reference signal may be arranged at an interval as evenly as possible. This helps improve channel interpolation estimation performance in a time-varying channel.

In a possible design, if a transmission mode of the terminal device is inter-time unit frequency hopping transmission, when X1=X2, N1=N2=K, where K is a positive integer greater than 1 and less than or equal to X1.

According to the foregoing design, a case in which a frequency at which the first reference signal locates is not applicable to a frequency at which the first uplink signal locates can be avoided. In this way, channel estimation precision may be improved.

In a possible design, an index of a start symbol in time domain symbols occupied by the first reference signal in the time unit included in the first transmission time period is the same as an index of a start symbol in time domain symbols occupied by the first uplink signal in the time unit included in the second transmission time period; and an index of an end symbol in the time domain symbols occupied by the first reference signal in the time unit included in the first transmission time period is the same as an index of an end symbol in the time domain symbols occupied by the first uplink signal in the time unit included in the second transmission time period.

According to the foregoing design, the indexes of the start symbol and the end symbol that are in the time domain symbols occupied by the first reference signal in the time unit included in the first transmission time period may not need to be additionally indicated. In this way, signaling overheads may be reduced.

In a possible design, the terminal device determines, based on third indication information, the time domain symbols occupied by the first reference signal in the time unit included in the first transmission time period. The third indication information indicates the indexes of the start symbol and the end symbol that are in the time domain symbols occupied by the first reference signal in the time unit included in the first transmission time period, or the third indication information indicates the index of the start symbol in the time domain symbols occupied by the first reference signal in the time unit included in the first transmission time period and a quantity of symbols occupied by the first reference signal. The third indication information may be configured by the network device by using higher layer signaling, or may be predefined in a protocol. If the third indication information is configured by the network device by using the higher layer signaling, the third indication information may be separate indication information, or may be carried in a same message as the first indication information. According to the foregoing design, no matter how many time domain symbols, in a time unit, on which the network device schedules the terminal device to transmit the first uplink signal, the time domain symbols occupied by the first reference signal in the time unit included in the first transmission time period do not change accordingly. Therefore, the network device can stably perform channel estimation by using the first reference signal.

In a possible design, a frequency domain resource occupied by the first reference signal is the same as a frequency domain resource occupied by the first uplink signal; or a frequency domain resource occupied by the first reference signal includes a frequency domain resource occupied by the first uplink signal and a frequency domain resource of Y frequency domain units other than the frequency domain resource occupied by the first uplink signal, where Y is a positive integer.

According to the foregoing design, it may be ensured that a channel estimation result of the first reference signal can be used to demodulate data that is carried in the first uplink signal at a same frequency.

In a possible design, the first indication information is included in a radio resource control RRC message sent by the network device to the terminal device, and/or the first indication information is included in downlink control information DCI sent by the network device to the terminal device.

According to the foregoing design, the network device may send the first indication information to the terminal device in a plurality of manners.

According to a second aspect, an embodiment of this application provides a communication method. The method includes: A network device determines a first transmission time period and a second transmission time period, receives a first reference signal in the first transmission time period, and receives a first uplink signal in the second transmission time period, where the first transmission time period includes X1 time units, the second transmission time period includes X2 time units, the first transmission time period does not overlap the second transmission time period, X1 is a positive integer, X2 is a positive integer, and the first uplink signal includes at least one of a PUSCH, a PUCCH, or a DMRS.

According to the foregoing design, a terminal device may additionally send the first reference signal, to improve uplink channel estimation performance of the network device. This improves coverage performance of a communication system.

In a possible design, the method further includes: The network device sends first indication information to the terminal device, where the first indication information indicates information about a ratio of a quantity of time units included in the first transmission time period to a quantity of time units included in the second transmission time period, or the first indication information indicates a quantity of time units included in the first transmission time period.

According to the foregoing design, the network device sends the first indication information, so that the terminal device determines a first transmission time unit based on the first indication information.

In a possible design, in the first transmission time period and the second transmission time period, every N1+N2 consecutive time units include N1 consecutive time units that are included in the first transmission time period and N2 consecutive time units that are included in the second transmission time period, where N1 is a positive integer less than or equal to X1, and N2 is a positive integer less than or equal to X2.

According to the foregoing design, the time unit included in the first transmission time period and the time unit included in the second transmission time period can be distributed as alternately as possible. The network device may perform, by using the first reference signal in different time units, interpolation estimation on a channel that is occupied by the first uplink signal separated by the first reference signal. This design is applicable to a case in which the terminal device moves at a high speed and a channel changes rapidly.

In a possible design, N1 is a quotient of X1 divided by Z, N2 is a quotient of X2 divided by Z, and Z is a greatest common divisor of X1 and X2.

According to the foregoing design, the first uplink signal and the first reference signal may be arranged at an interval as evenly as possible. This helps improve channel interpolation estimation performance in a time-varying channel.

In a possible design, if a transmission mode of the terminal device is inter-time unit frequency hopping transmission, when X1=X2, N1=N2=K, where K is a positive integer greater than 1 and less than or equal to X1.

According to the foregoing design, a case in which a frequency location of the first reference signal cannot include a frequency location of the first uplink signal can be avoided. In this way, channel estimation precision may be improved.

In a possible design, an index of a start symbol in time domain symbols occupied by the first reference signal in the time unit included in the first transmission time period is the same as an index of a start symbol in time domain symbols occupied by the first uplink signal in the time unit included in the second transmission time period; and an index of an end symbol in the time domain symbols occupied by the first reference signal in the time unit included in the first transmission time period is the same as an index of an end symbol in the time domain symbols occupied by the first uplink signal in the time unit included in the second transmission time period.

According to the foregoing design, the indexes of the start symbol and the end symbol that are in the time domain symbols occupied by the first reference signal in the time unit included in the first transmission time period may not need to be additionally indicated. In this way, signaling overheads may be reduced.

In a possible design, a frequency domain resource occupied by the first reference signal is the same as a frequency domain resource occupied by the first uplink signal; or a frequency domain resource occupied by the first reference signal includes a frequency domain resource occupied by the first uplink signal and a frequency domain resource of Y frequency domain units other than the frequency domain resource occupied by the first uplink signal, where Y is a positive integer.

According to the foregoing design, it may be ensured that a channel estimation result of the first reference signal can be used to demodulate data that is carried in the first uplink signal at a same frequency.

According to a third aspect, an embodiment of this application provides a communication apparatus. The apparatus may be a terminal device, or may be a chip in the terminal device. The apparatus may include a processing unit, a sending unit, and a receiving unit. It should be understood that the sending unit and the receiving unit herein may alternatively be a transceiver unit. When the apparatus is the terminal device, the processing unit may be a processor, and the sending unit and the receiving unit may be a transceiver. The terminal device may further include a storage unit, and the storage unit may be a memory. The storage unit is configured to store instructions. The processing unit executes the instructions stored in the storage unit, so that the terminal device performs the method according to any one of the first aspect or the possible designs of the first aspect. When the apparatus is the chip in the terminal device, the processing unit may be a processor, and the sending unit and the receiving unit may be input/output interfaces, pins, circuits, or the like. The processing unit executes instructions stored in a storage unit, so that the chip performs the method according to any one of the first aspect or the possible designs of the first aspect. The storage unit is configured to store the instructions. The storage unit may be a storage unit (for example, a register or a cache) in the chip, or may be a storage unit (for example, a read-only memory or a random access memory) that is in the terminal device and that is located outside the chip.

According to a fourth aspect, an embodiment of this application provides a communication apparatus. The apparatus may be a network device, or may be a chip in the network device. The apparatus may include a processing unit, a sending unit, and a receiving unit. It should be understood that the sending unit and the receiving unit herein may alternatively be a transceiver unit. When the apparatus is the network device, the processing unit may be a processor, and the sending unit and the receiving unit may be a transceiver. The network device may further include a storage unit, and the storage unit may be a memory. The storage unit is configured to store instructions. The processing unit executes the instructions stored in the storage unit, so that the network device performs the method according to any one of the second aspect or the possible designs of the second aspect. When the apparatus is the chip in the network device, the processing unit may be a processor, and the sending unit and the receiving unit may be input/output interfaces, pins, circuits, or the like. The processing unit executes instructions stored in a storage unit, so that the chip performs the method according to any one of the second aspect or the possible designs of the second aspect. The storage unit is configured to store the instructions. The storage unit may be a storage unit (for example, a register or a cache) in the chip, or may be a storage unit (for example, a read-only memory or a random access memory) that is in the network device and that is located outside the chip.

According to a fifth aspect, an embodiment of this application further provides a computer-readable storage medium. The computer-readable storage medium stores a computer program. When the computer program runs on a computer, the computer is enabled to perform the methods according to the first aspect and the second aspect.

According to a sixth aspect, an embodiment of this application further provides a computer program product including a program. When the program runs on a computer, the computer is enabled to perform the methods according to the first aspect and the second aspect.

DESCRIPTION OF EMBODIMENTS

The following describes embodiments of this application with reference to accompanying drawings.

This application is mainly applied to a fifth generation wireless communication (NR) system, and may be further applied to other communication systems, for example, a long term evolution (LTE) system, a long term evolution advanced (LTE-Advanced, LTE-A) system, a narrowband internet of things (NB-IoT) system, a machine type communication (MTC) system, and a future next-generation communication system.

Figure 1:
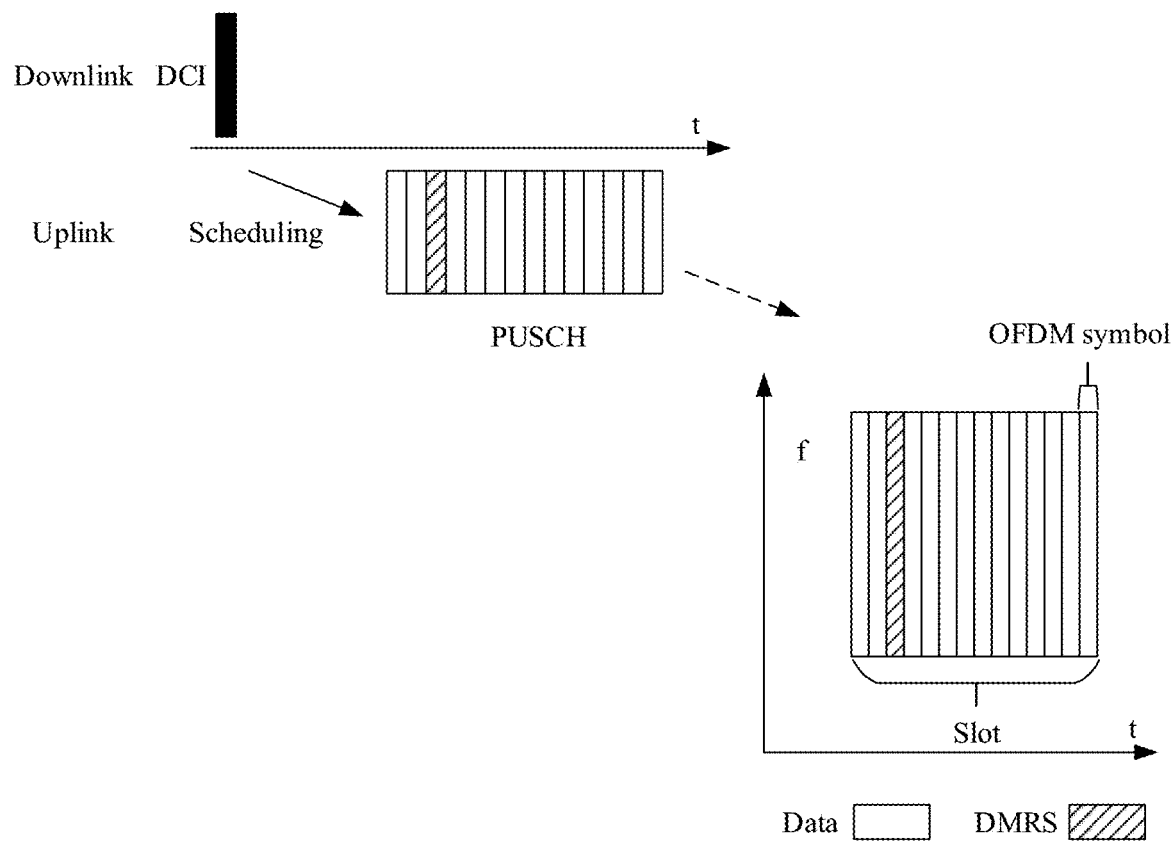
FIG. 1 is a schematic diagram of scheduling transmission by using DCI according to this application.
Figure 2:
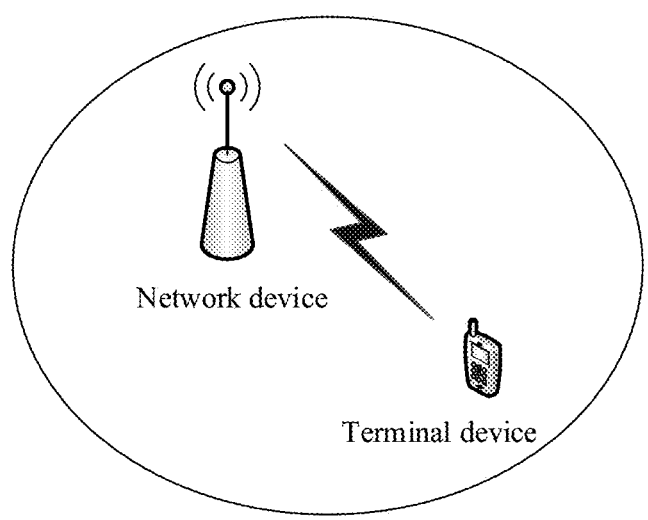
FIG. 2 is a first schematic diagram of a structure of a communication system according to this application.

Network elements in the embodiments of this application include a terminal device and a network device. As shown in FIG. 2, a communication system includes a network device and a terminal device. In the communication system, the network device sends information to the terminal device through a downlink channel, and the terminal device sends information to the network device through an uplink channel. The terminal device may be a mobile phone, a tablet computer, a computer with wireless sending and receiving functions, an internet of things terminal device, or the like. The terminal device may also be referred to as a mobile station, a mobile, a remote station, a remote terminal, an access terminal, or a user agent. The terminal device may alternatively be an automobile in vehicle-to-vehicle (V2V) communication, a machine in machine type communication, or the like. This is not limited herein. The network device may be base stations in various forms, for example, a macro base station, a micro base station (also referred to as a small cell), a relay station, an access point, an evolved NodeB (eNodeB), a wireless fidelity access point (Wi-Fi AP), or a worldwide interoperability for microwave access base station (WiMAX BS). This is not limited herein. In addition, a network device capable of providing a radio access function may have different names in systems using different radio access technologies. For example, the network device is referred to as an evolved NodeB (eNB or eNodeB) in an LTE system, a NodeB in a 3rd generation (3G) system, or a gNB in an NR system.

Figure 3:
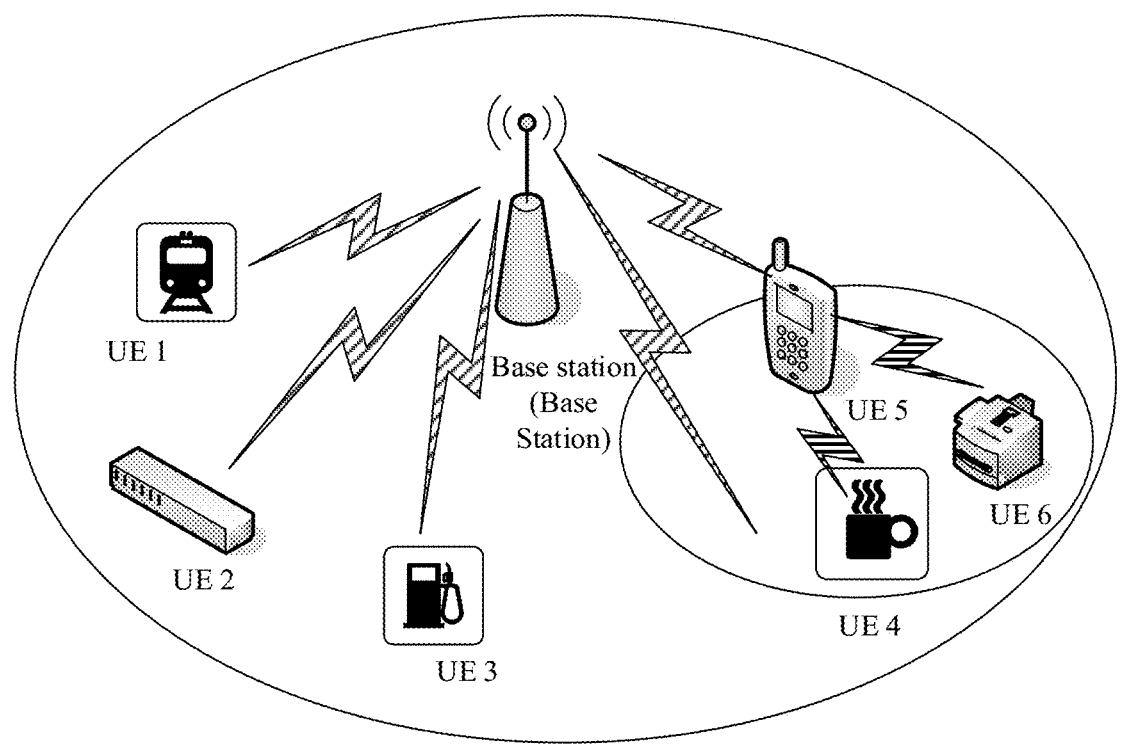
FIG. 3 is a second schematic diagram of a structure of a communication system according to this application.

As an optional communication system, a communication system shown in FIG. 3 includes a base station and UE 1 to UE 6. In the communication system, the UE 1 to the UE 6 may send uplink data to the base station, and the base station may send downlink data to the UE 1 to the UE 6. In addition, a communication system may alternatively include the UE 4 to the UE 6. In the communication system, the UE 4 and the UE 6 may send uplink data to the UE 5, and the UE 5 may send downlink data to the UE 4 and the UE 6.

The foregoing network elements may be network elements implemented on dedicated hardware, may be software instances running on the dedicated hardware, or may be instances of virtualized functions on an appropriate platform. In addition, the embodiments of this application are further applicable to another future-oriented communication technology. Network architectures and service scenarios described in this application are intended to describe the technical solutions in this application more clearly, but are not intended to limit the technical solutions provided in this application. A person of ordinary skill in the art may know that as the network architectures evolve and anew service scenario emerges, the technical solutions provided in this application are also applicable to similar technical problems.

In the embodiments of this application, one time unit includes a plurality of time domain symbols. For example, the time unit may be a subframe, may be a slot, or may be a symbol group including the plurality of time domain symbols. In an LTE system, single carrier frequency division multiple access (SC-FDMA) is used in uplink. The single carrier frequency division multiple access is also referred to as discrete Fourier transformation-spread-orthogonal frequency division multiplexing (DFT-s-OFDM). Therefore, an uplink time domain symbol is an SC-FDMA symbol in the LTE system. In an NR system, OFDM or DFT-s-OFDM is used in uplink. Therefore, an uplink time domain symbol is an OFDM symbol or a DFT-s-OFDM symbol in the NR system. A first reference signal may also be referred to as an extra reference signal (ERS), or may be a reference signal with another name. This is not limited in this application.

In a wireless communication system, for example, in the NR system, information exchanged between UE and a gNB is carried by using a physical channel. Data sent by the UE, namely, uplink data, is usually carried by using a PUSCH. Control information sent by the UE, namely, uplink control information, is usually carried by using a physical uplink control channel (PUCCH). A DMRS used for uplink channel estimation is always sent together with the PUSCH or the PUCCH.

For example, a network device sends DCI to schedule UE to transmit a PUSCH. From a time domain perspective, the network device may schedule the UE to transmit the PUSCH in one slot, or may schedule the UE to transmit the PUSCH in a plurality of consecutive slots. In a slot, the network device may schedule the UE to transmit an uplink signal by using all OFDM symbols, or may schedule the UE to transmit an uplink signal by using a part of OFDM symbols in the slot. Assuming that all the OFDM symbols in the entire slot are used to transmit the PUSCH and a DMRS, a ratio of a quantity of OFDM symbols occupied by the PUSCH to a quantity of OFDM symbols occupied by the DMRS ranges from "13:1" to "10:4". Therefore, an adjustment range of the quantity of OFDM symbols occupied by the DMRS is limited, and channel estimation performance cannot be improved because a gNB cannot increase, based on an actual uplink channel estimation requirement, a quantity of reference signals to be sent by the UE.

Figure 4:
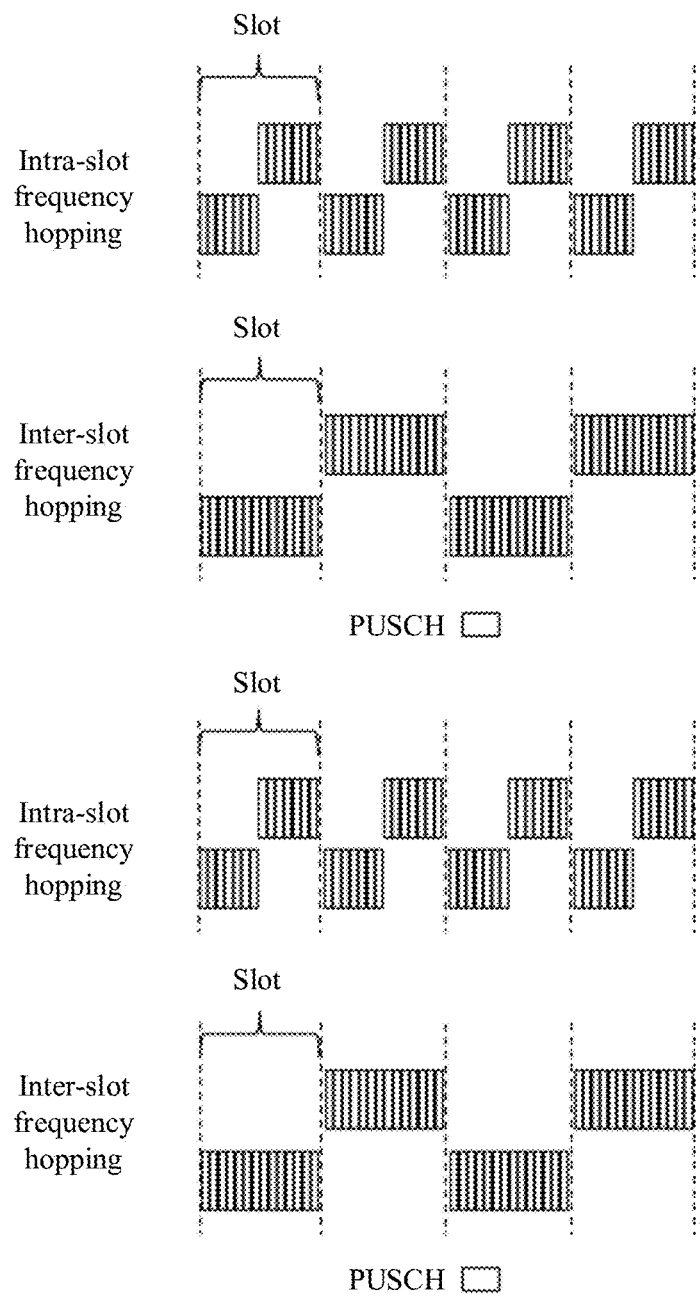
FIG. 4 is a schematic diagram of frequency hopping transmission according to this application.

In addition, frequency hopping transmission is supported in NR. Using a PUSCH as an example, the frequency hopping transmission means that the PUSCH is transmitted on different frequency domain resources in different time periods in a PUSCH transmission process. As shown in FIG. 4, frequency hopping transmission is classified into intra-slot frequency hopping and inter-slot frequency hopping in NR. In a frequency hopping transmission process, because different frequency domain resources are used in the PUSCH transmission process, a frequency domain resource diversity gain can be obtained, and impact of deep fading of a radio channel on a part of the frequency domain resources can be resisted to some extent. In the intra-slot frequency hopping, time domain symbols for transmitting the PUSCH in each slot are divided into two parts, and the parts are transmitted by using different frequency domain resources. The first part of the slot corresponds to a same frequency domain resource, and the second part of the slot corresponds to a same frequency domain resource. In the inter-slot frequency hopping, an odd-numbered slot corresponds to a same frequency domain resource, and an even-numbered slot corresponds to a same frequency domain resource. Currently, NR does not support simultaneous occurrence of the intra-slot frequency hopping and the inter-slot frequency hopping.

Figure 5:
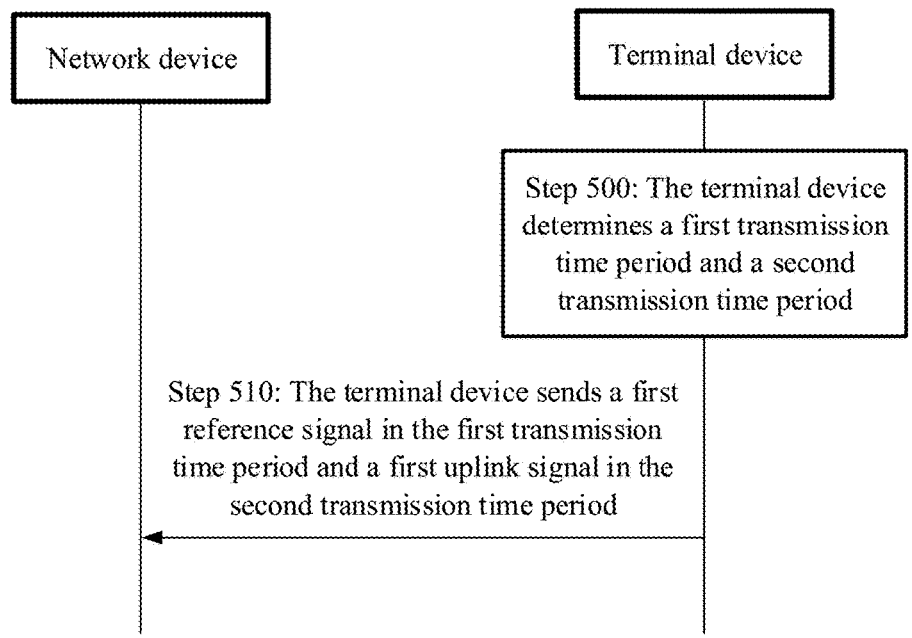
FIG. 5 is a schematic flowchart of a communication method according to this application.

Based on this, the embodiments of this application provide a communication method, to improve uplink channel estimation performance. As shown in FIG. 5, the method includes the following steps.

Step 500: A terminal device determines a first transmission time period and a second transmission time period, where the first transmission time period includes X1 time units, the second transmission time period includes X2 time units, and the first transmission time period does not overlap the second transmission time period, where X1 is a positive integer, and X2 is a positive integer.

Step 510: The terminal device sends a first reference signal in the first transmission time period and a first uplink signal in the second transmission time period, where the first uplink signal includes at least one of a PUSCH, a PUCCH, or a DMRS.

In an example, before the terminal device determines the first transmission time period and the second transmission time period, a network device may configure, by using higher layer signaling, the terminal device to send the first reference signal. For example, the network device configures, by using RRC signaling, the terminal device to send the first reference signal. When the network device schedules, by using DCI, the terminal device to send the first uplink signal, the terminal device determines the first transmission time period and the second transmission time period, and sends the first reference signal in the first transmission time period and the first uplink signal in the second transmission time period. Therefore, the network device may flexibly configure, based on an uplink channel estimation requirement, whether the first reference signal needs to be sent.

In another example, before the terminal device determines the first transmission time period and the second transmission time period, a network device may configure, by using higher layer signaling, the terminal device to send the first reference signal. When the network device schedules, by using DCI, the terminal device to send the first uplink signal, a field in the DCI indicates the terminal device whether to send the first reference signal. If the field indicates the terminal device to send the first reference signal, the terminal device determines the first transmission time period and the second transmission time period, and sends the first reference signal in the first transmission time period and the first uplink signal in the second transmission time period. According to the method, the network device may not only flexibly configure the first reference signal based on an uplink channel estimation requirement, but also more flexibly provide, by using the DCI, a dynamic indication to sending of the first reference signal.

In a possible design, the terminal device may determine the first transmission time period based on first indication information. The first indication information may be configured by the network device by using higher layer signaling, or may be predefined in a protocol, that is, the first indication information does not need to be configured, notified, or indicated by the network device. The first indication information indicates a quantity of time units included in the first transmission time period, or the first indication information indicates information about a ratio of a quantity of time units included in the first transmission time period to a quantity of time units included in the second transmission time period. For example, the first indication information indicates the ratio of the quantity of time units included in the first transmission time period to the quantity of time units included in the second transmission time period, namely, X1:X2. Alternatively, the first indication information indicates a ratio of the quantity of time units included in the first transmission time period to a quantity of time units included in a third transmission time period, namely, X1:(X1+X2). Alternatively, the first indication information indicates a ratio of the quantity of time units included in the second transmission time period to a quantity of time units included in a third transmission time period, namely, X2:(X1+X2).

A quantity of slots in which the PUSCH is located is used as an example. A ratio of a quantity $N_r$ of slots in which the first reference signal is located to a quantity $N_p$ of slots in which the PUSCH is located is $r=N_r/N_p=1/2$. In this case, if the quantity of slots in which the PUSCH is located is $N_p=4$, the quantity of slots in which the first reference signal is located is $N_r=N_p \cdot r=2$. Particularly, for a case in which $N_p \cdot r$ is not an integer, it may be pre-specified that rounding up or rounding down is to be performed on a product. Using the rounding down as an example, if $r=1/2$, and $N_p=7$, $N_r=\lfloor N_p \cdot r \rfloor=3$.

In addition, the first indication information may alternatively include a plurality of pieces of information about a ratio of a quantity of time units included in the first transmission time period to a quantity of time units included in the second transmission time period, or the first indication information may include a plurality of quantities of time units included in the first transmission time period. When the network device schedules transmission of the first uplink signal by using the DCI, the network device may indicate, by using a field in the DCI, the terminal device to use one of the plurality of pieces of information about the ratio or one of the plurality of quantities of time units included in the first transmission time period. For example, a base station may configure four different ratios of a quantity $N_r$ of slots in which the first reference signal is located to a quantity $N_p$ of slots in which the PUSCH is located, where the ratios are $r=\{2,1,1/2,1/4\}$. The four ratios correspond one-to-one to states "00", "01", "10", and "11" of a 2-bit field in the DCI. When the network device schedules, by using the DCI, the terminal device to transmit the PUSCH, the network device may indicate, by using a specific value of the 2-bit field, UE to use one of the ratios. According to the foregoing design, flexibility of the quantity of time units included in the first transmission time period may be improved.

Further, manners in which the terminal device determines the first transmission time period based on the first indication information include but are not limited to the following:

Manner 1: The terminal device determines the first transmission time period based on the first indication information and the second transmission time period.

Figure 6:
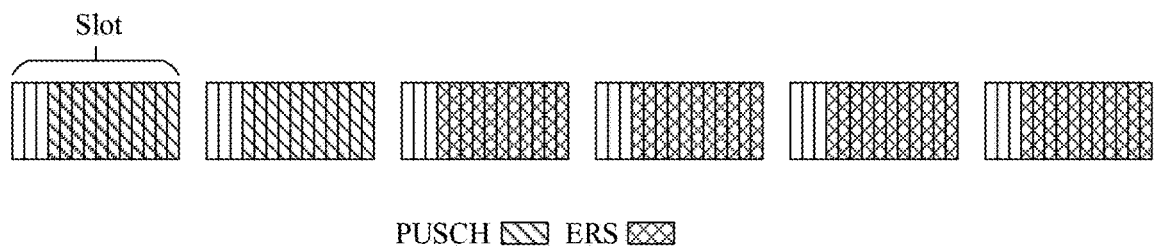
FIG. 6 is a first schematic diagram of a location relationship between a first transmission time period and a second transmission time period according to this application.
Figure 7:
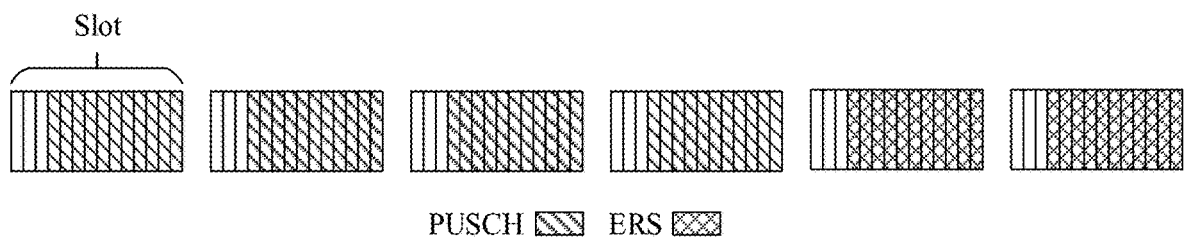
FIG. 7 is a second schematic diagram of a location relationship between a first transmission time period and a second transmission time period according to this application.
Figure 8:
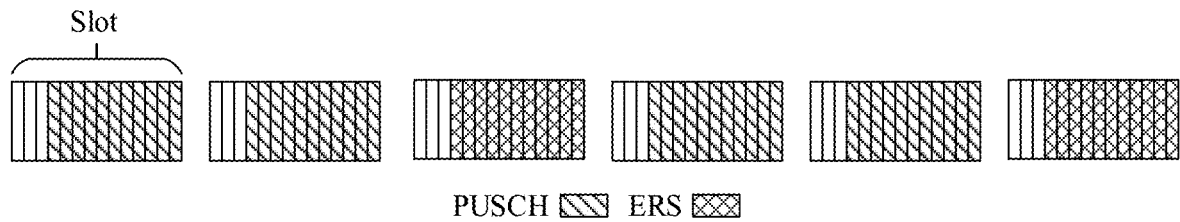
FIG. 8 is a third schematic diagram of a location relationship between a first transmission time period and a second transmission time period according to this application.

In an example, the terminal device determines the first transmission time period based on the second transmission time period and the information that is indicated by the first indication information and that is about the ratio of the quantity of time units included in the first transmission time period to the quantity of time units included in the second transmission time period. Specifically, the network device may send DCI to the terminal device, where the DCI indicates the quantity of time units included in the second transmission time period and a location of the second transmission time period. The location of the second transmission time period may also be understood as a location of a time unit included in the second transmission time period, for example, a start moment of the time unit included in the second transmission time period. The terminal device may determine, based on the quantity of time units included in the second transmission time period and the information that is indicated by the first indication information and that is about the ratio of the quantity of time units included in the first transmission time period to the quantity of time units included in the second transmission time period, the quantity of time units included in the first transmission time period. Further, the terminal device may determine a location relationship between the first transmission time period and the second transmission time period based on a location relationship that is indicated by second indication information and that is between the first transmission time period and the second transmission time period and the location of the second transmission time period. For example, all the time units included in the first transmission time period are before the time units included in the second transmission time period (as shown in FIG. 6); all the time units included in the first transmission time period are after the time units included in the second transmission time period (as shown in FIG. 7); or the time units included in the first transmission time period and the time units included in the second transmission time period are alternately arranged (as shown in FIG. 8).

In another example, the terminal device determines the first transmission time period based on the second transmission time period and the quantity that is indicated by the first indication information and that is of time units included in the first transmission time period. Specifically, the network device sends a DCI message to the terminal device, where the DCI message indicates the quantity of time units included in the second transmission time period and a location of the second transmission time period. The terminal device may determine a location relationship between the first transmission time period and the second transmission time period based on a location relationship that is indicated by second indication information and that is between the first transmission time period and the second transmission time period and the location of the second transmission time period, as shown in FIG. 6, FIG. 7, and FIG. 8.

Manner 2: The terminal device determines the first transmission time period based on the first indication information and the third transmission time period. The third transmission time period is a transmission time period that includes the first transmission time period and a second transmission time period.

In an example, the terminal device determines the first transmission time period based on the third transmission time period and the information that is indicated by the first indication information and that is about the ratio of the quantity of time units included in the first transmission time period to the quantity of time units included in the second transmission time period. Specifically, the network device may send DCI to the terminal device, where the DCI indicates the quantity of time units included in the third transmission time period and a location of the third transmission time period. The location of the third transmission time period may also be understood as a location of a time unit included in the third transmission time period, for example, a start moment of the time unit included in the third transmission time period. The terminal device may determine, based on the quantity of time units included in the third transmission time period and the information that is indicated by the first indication information and that is about the ratio of the quantity of time units included in the first transmission time period to the quantity of time units included in the second transmission time period, the quantity of time units included in the first transmission time period. Further, the terminal device may determine a location relationship between the first transmission time period and the second transmission time period based on a location relationship that is indicated by second indication information and that is between the first transmission time period and the second transmission time period and the location of the third transmission time period, as shown in FIG. 6, FIG. 7, and FIG. 8.

In another example, the terminal device determines the first transmission time period based on the third transmission time period and the quantity that is indicated by the first indication information and that is of time units included in the first transmission time period. Specifically, the network device sends a DCI message to the terminal device, where the DCI message indicates the quantity of time units included in the third transmission time period and a location of the third transmission time period. The terminal device may determine a location relationship between the first transmission time period and the second transmission time period based on a location relationship that is indicated by second indication information and that is between the first transmission time period and the second transmission time period and the location of the third transmission time period, as shown in FIG. 6, FIG. 7, and FIG. 8.

It should be understood that the second indication information indicates the location relationship between the first transmission time period and the second transmission time period, and the second indication information may be configured by the network device by using higher layer signaling, or may be predefined in a protocol, that is, the second indication information does not need to be indicated by the network device. If the second indication information is configured by the network device by using the higher layer signaling, the second indication information may be separate indication information, or may be carried in a same message as the first indication information.

Based on the foregoing two manners, in the first transmission time period and the second transmission time period, every N1+N2 consecutive time units include N1 consecutive time units that are included in the first transmission time period and N2 consecutive time units that are included in the second transmission time period, where N1 is a positive integer less than or equal to X1, and N2 is a positive integer less than or equal to X2. For example, when N1=X1 and N2=X2, the location relationship between the first transmission time period and the second transmission time period may be shown in FIG. 6 or FIG. 7. As shown in FIG. 6, when the first transmission time period is located before the second transmission time period, that is, the terminal device first completes sending the first reference signal, and then sends the first uplink signal, the network device can perform energy combination on the first reference signals in adjacent time units and then perform channel estimation. In this way, good estimation precision may be achieved. Therefore, the network device may first perform channel estimation by using the first reference signal, and perform equalization and demodulation on the subsequent first uplink signal by using a channel estimation result. This manner is particularly applicable to a case in which the terminal device moves at a low speed and a channel changes slowly. As shown in FIG. 7, when the first transmission time period is located after the second transmission time period, that is, the terminal device first completes sending the first uplink signal and then sends the first reference signal, the network device needs to first receive and store the first uplink signal that is first sent, performs channel estimation by using the subsequently received first reference signal, and then performs equalization and demodulation on the stored first uplink signal.

When N1≠X1 or N2≠X2, the location relationship between the first transmission time period and the second transmission time period may be shown in FIG. 8. As shown in FIG. 8, a ratio of a quantity $N_r$ of slots in which a first reference signal is located to a quantity $N_p$ of slots in which a PUSCH is located is $r=N_r/N_p=1/2$. The terminal device may insert, in the first transmission time period and the second transmission time period, one slot in which the first reference signal is located every two slots in which the first uplink signal is located (to be specific, a slot in which the PUSCH is located). For another example, if the ratio of the quantity $N_r$ of slots in which the first reference signal is located to the quantity $N_p$ of the slots in which the PUSCH is located is $r=N_r/N_p=1/2<1$, one slot in which the first reference signal is located is inserted every $N_p/N_r$ slots in which the PUSCH is located; or if r=>1, one slot in which the PUSCH is located is inserted every $N_p/N_r$ slots in which the first reference signal is located.

It should be understood that in FIG. 8, that the PUSCH is first sent is used as an example. Alternatively, the first reference signal may be first sent, provided that a sequence of sending the first reference signal and the PUSCH is pre-specified, or is indicated by using higher layer signaling. According to the foregoing design, the time unit included in the first transmission time period and the time unit included in the second transmission time period can be distributed as alternately as possible. The network device may perform, by using the first reference signal in different time units, interpolation estimation on a channel that is occupied by the first uplink signal separated by the first reference signal. This design is applicable to a case in which the terminal device moves at a high speed and a channel changes rapidly. In a possible design, N1 is a quotient of X1 divided by Z, N2 is a quotient of X2 divided by Z, and Z is a greatest common divisor of X1 and X2. According to the method, the first uplink signal and the first reference signal may be arranged at an interval as evenly as possible. This helps improve channel interpolation estimation performance in a time-varying channel.

Figure 9A:
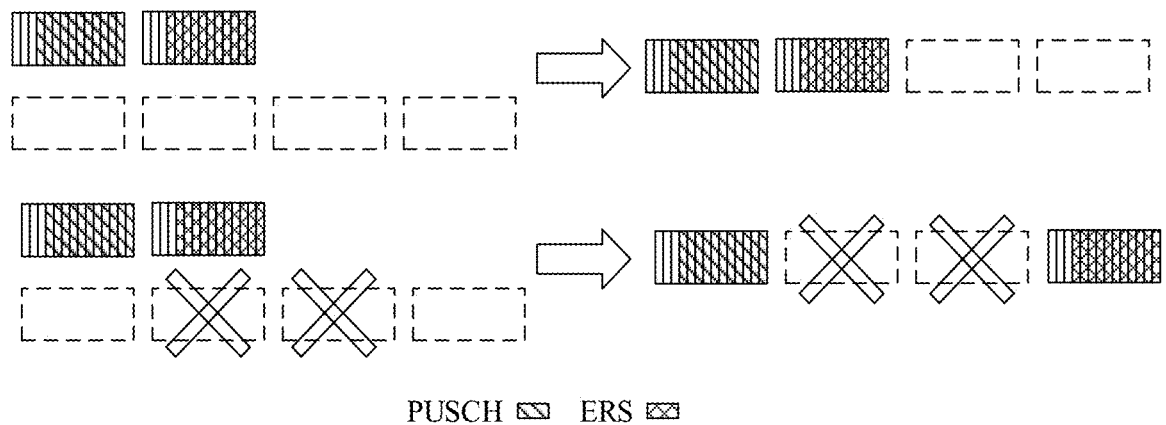
FIG. 9A and FIG. 9B are schematic diagrams of a time unit included in a first transmission time period and a time unit included in a second transmission time period according to this application.

In a possible case, considering that some time units may not be used for uplink sending, for example, some time units may be downlink time units or reserved time units, in this embodiment of this application, both the time unit included in the first transmission time period and the time unit included in the second transmission time period are time units that can be used by the terminal device to perform uplink transmission. As shown in FIG. 9A, all slots in the upper part of FIG. 9A are slots in which a first reference signal and a PUSCH can be sent, and only two slots in the lower part of FIG. 9A are slots in which the first reference signal and the PUSCH can be sent. A slot marked with a cross is a slot that cannot be used for uplink sending. Therefore, the first reference signal and the PUSCH are sent only in an available uplink slot.

In another possible case, the terminal device first does not consider whether a time unit is available and determines the first transmission time period and the second transmission time period according to the method shown in FIG. 5. Then, the terminal device further sends, based on whether the time unit included in the first transmission time period is available and whether the time unit included in the second transmission time period is available, the first reference signal only in an available time unit included in the first transmission time period and the first uplink signal only in an available time unit included in the second transmission time period. Whether the time unit is available herein refers to whether the time unit is a time unit that can be used by the terminal device to perform uplink transmission.

Figure 9B:
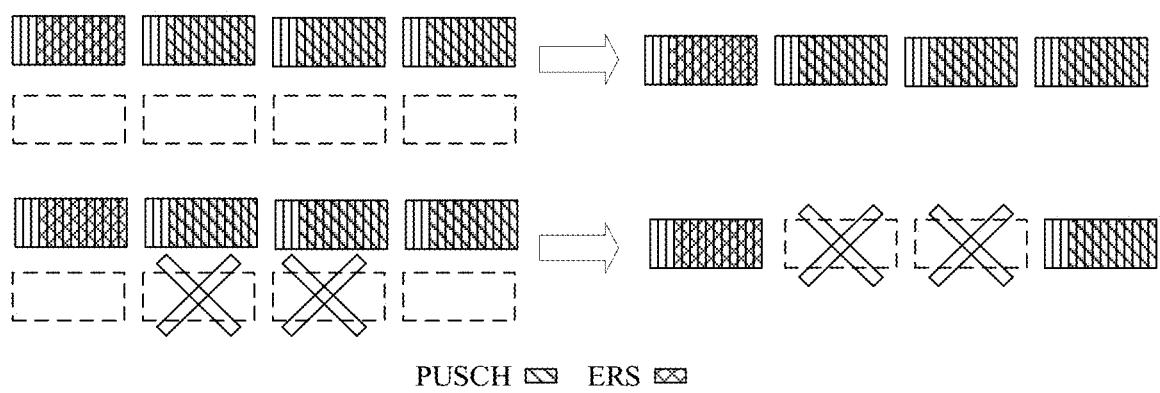

As shown in FIG. 9B, the terminal device first does not consider whether a slot is available, that is, the terminal device does not specifically determine which slot is a slot that can be used by the terminal device to perform uplink transmission. The terminal device determines that a quantity of slots in which a first reference signal is located is 1 and a quantity of slots in which a PUSCH is located is 3, and determines that the slot in which the first reference signal is located is before the three slots in which the PUSCH is located, and then further separately determines whether the four slots are available. In the upper part of FIG. 9B, the terminal device determines that the four slots in the figure are four consecutive slots that can be used by the terminal device to perform uplink transmission. In this case, the quantity of slots in which the first reference signal is actually located is 1, the quantity of slots in which the PUSCH is actually located is 3, and the slot in which the first reference signal is located is before the three slots in which the PUSCH is located. In the lower part of FIG. 9B, if the terminal device determines that the first slot in the figure is a slot that can be used by the terminal device to perform uplink transmission, the slot is the slot in which the first reference signal is located. If the terminal device determines that the second slot in the figure is a slot that cannot be used by the terminal device to perform uplink transmission, the terminal device continues to determine whether the third slot in the figure is a slot that can be used by the terminal device to perform uplink transmission. If the terminal device determines that the third slot in the figure is a slot that cannot be used by the terminal device to perform uplink transmission, the terminal device continues to determine whether the fourth slot in the figure is a slot that can be used by the terminal device to perform uplink transmission. If the terminal device determines that the fourth slot in the figure is a slot that can be used by the terminal device to perform uplink transmission, the slot is the slot in which the PUSCH is located. In this case, the quantity of slots in which the first reference signal is actually located is 1, the quantity of slots in which the PUSCH is actually located is 1, and the slot in which the first reference signal is located is before the slot in which the PUSCH is located.

In addition, the terminal device further needs to determine time domain symbols occupied by the first reference signal in the time unit included in the first transmission time period and a frequency domain resource occupied by the first reference signal in addition to determining the quantity of time units included in the first transmission time period and the location relationship between the first transmission time period and the second transmission time period.

Figure 10:
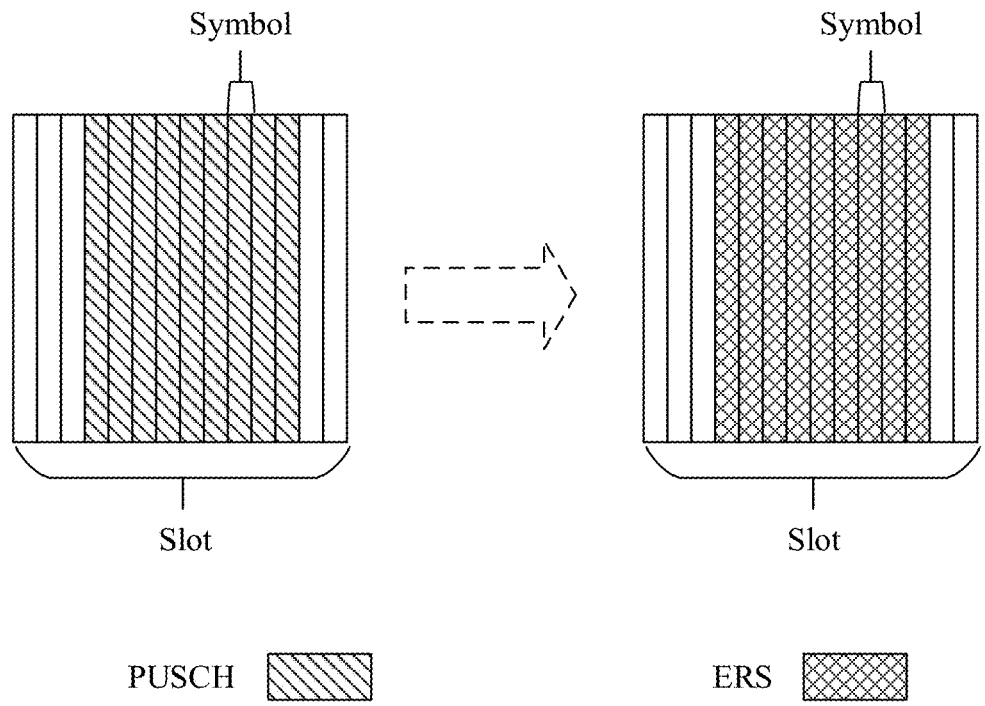
FIG. 10 is a first schematic diagram of time domain symbols occupied by a first reference signal in a time unit included in a first transmission time period according to this application.

In a possible design, the terminal device determines, based on third indication information, the time domain symbols occupied by the first reference signal in the time unit included in the first transmission time period. For example, a feasible method is as follows: The third indication information indicates an index of a start symbol and an index of an end symbol that are in the time domain symbols occupied by the first reference signal in the time unit included in the first transmission time period. For another example, another feasible method is as follows: The third indication information indicates an index of a start symbol in the time domain symbols occupied by the first reference signal in the time unit included in the first transmission time period and a quantity of occupied symbols. The third indication information may be configured by the network device by using higher layer signaling, as shown in FIG. 10, or may be predefined in a protocol. If the third indication information is configured by the network device by using higher layer signaling, the third indication information may be separate indication information, or may be carried in a same message as the first indication information. According to the foregoing design, no matter how many time domain symbols, in a time unit, on which the network device schedules the terminal device to transmit the first uplink signal, the time domain symbols occupied by the first reference signal in the time unit included in the first transmission time period do not change accordingly. Therefore, the network device can stably perform channel estimation by using the first reference signal.

Figure 11:
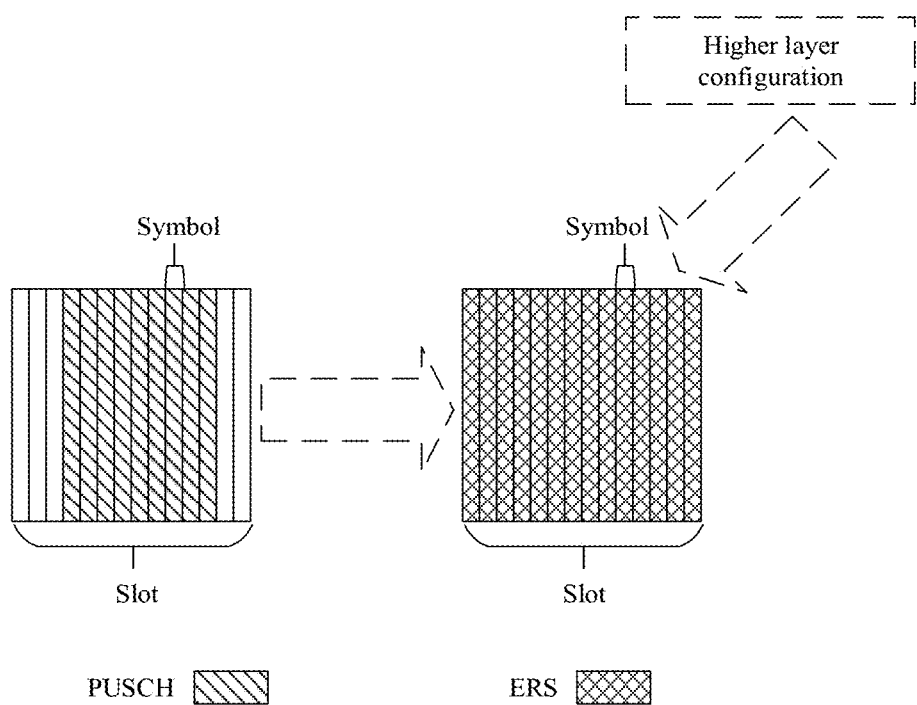
FIG. 11 is a second schematic diagram of time domain symbols occupied by a first reference signal in a time unit included in a first transmission time period according to this application.

In another possible design, an index of a start symbol in the time domain symbols occupied by the first reference signal in the time unit included in the first transmission time period is the same as an index of a start symbol in time domain symbols occupied by the first uplink signal in the time unit included in the second transmission time period; and an index of an end symbol in the time domain symbols occupied by the first reference signal in the time unit included in the first transmission time period is the same as an index of an end symbol in the time domain symbols occupied by the first uplink signal in the time unit included in the second transmission time period. A range of the time domain symbols occupied by the first uplink signal may be flexibly indicated. It should be understood that the foregoing design may be configured by the network device by using higher layer signaling, or may be predefined in a protocol, that is, indication by the network device is not required. If the content of the foregoing design is configured by the network device by using the higher layer signaling, the content of the foregoing design may be indicated by using separate indication information, or may be a carried in same message as the first indication information. For example, as shown in FIG. 11, OFDM symbols occupied by a first reference signal in a slot are the same as OFDM symbols occupied by a PUSCH in a slot. According to the foregoing design, the indexes of the start symbol and the end symbol that are in the time domain symbols occupied by the first reference signal in the time unit included in the first transmission time period may not need to be additionally indicated, so that signaling overheads can be reduced. In addition, indication flexibility is improved.

Figure 12:
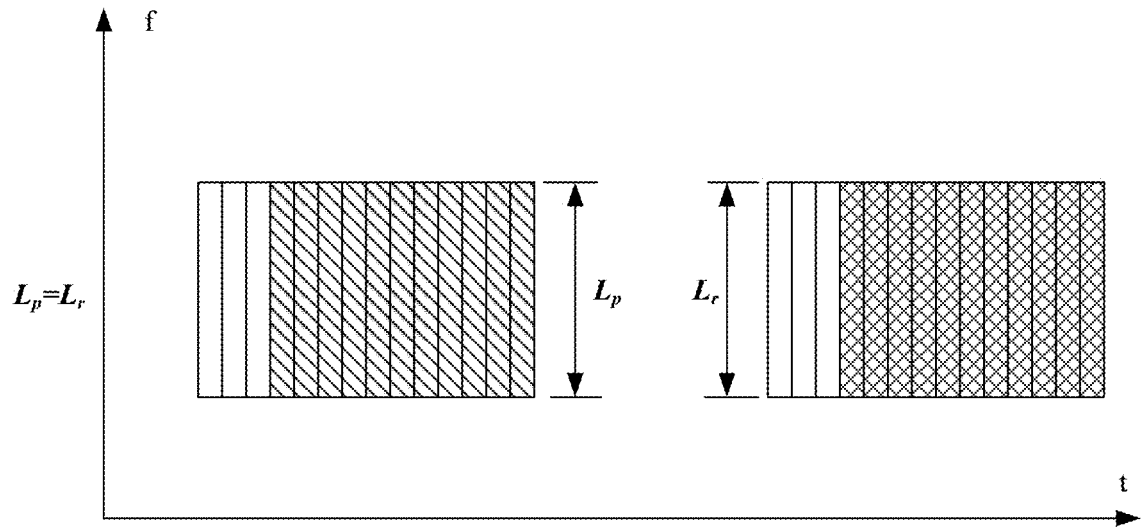
FIG. 12 is a first schematic diagram of a frequency domain resource occupied by a first reference signal according to this application.

In a possible design, the frequency domain resource occupied by the first reference signal is the same as a frequency domain resource occupied by the first uplink signal. As shown in FIG. 12, a frequency domain resource occupied by a first reference signal is completely the same as a frequency domain resource occupied by a PUSCH. According to the foregoing design, it may be ensured that the channel estimation result of the first reference signal can be used to demodulate data that is carried in the first uplink signal at a same frequency.

Figure 13:
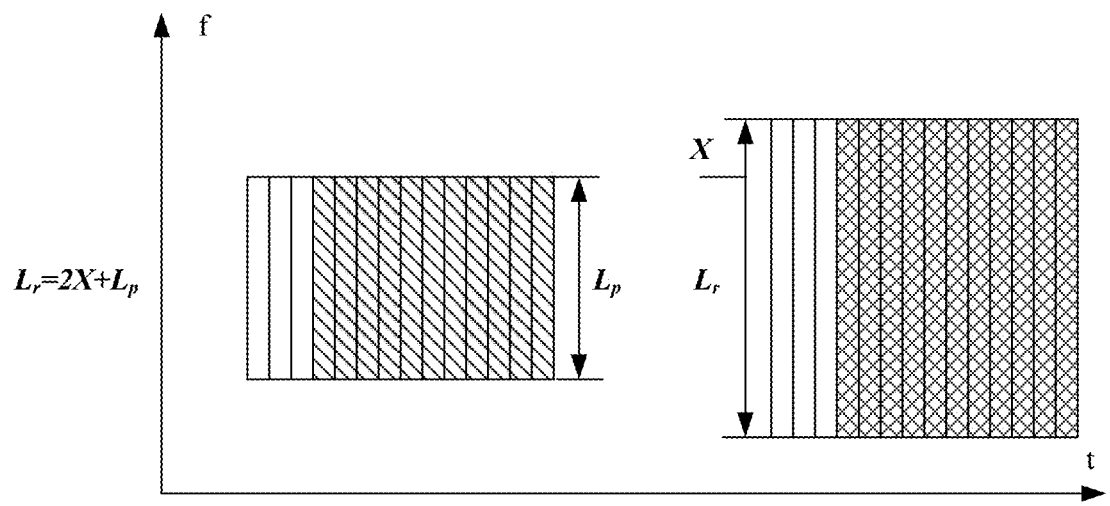
FIG. 13 is a second schematic diagram of a frequency domain resource occupied by a first reference signal according to this application.

In another possible design, the frequency domain resource occupied by the first reference signal includes the frequency domain resource occupied by the first uplink signal and a frequency domain resource of Y frequency domain units other than the frequency domain resource occupied by the first uplink signal, where Y is a positive integer. For example, the frequency domain unit may be a resource block (RB), a resource block group (RB group or RBG), or a resource element (RE). For example, the frequency domain unit is the RB. As shown in FIG. 13, a frequency domain resource occupied by a first reference signal includes not only a frequency domain resource occupied by a PUSCH but also ±X adjacent resource blocks other than the frequency domain resource occupied by the PUSCH, where X is a positive integer. According to the foregoing design, for some channel estimation algorithms, the network device may increase precision of channel estimation on a target frequency domain resource by using a reference signal adjacent to the target frequency domain resource.

It should be understood that the method provided in this embodiment of this application is not only applicable to a scenario in which the network device schedules transmission by using DCI, but also applicable to a scenario of configured grant transmission. Details are not repeatedly described again.

In conclusion, according to the method provided in this embodiment of this application, the terminal device sends the first reference signal in the first transmission time period and the first uplink signal in the second transmission time period. The first transmission time period does not overlap the second transmission time period, so that uplink channel estimation performance of the network device can be improved. Therefore, coverage performance of a communication system is improved.

Based on a same idea, the method provided in this embodiment of this application may also be applied to frequency hopping transmission. There are two frequency hopping transmission manners: infra-time unit frequency hopping and inter-time unit frequency hopping.

In a possible design, a frequency hopping manner of the first reference signal is the same as a frequency hopping manner of the first uplink signal.

Figure 14:
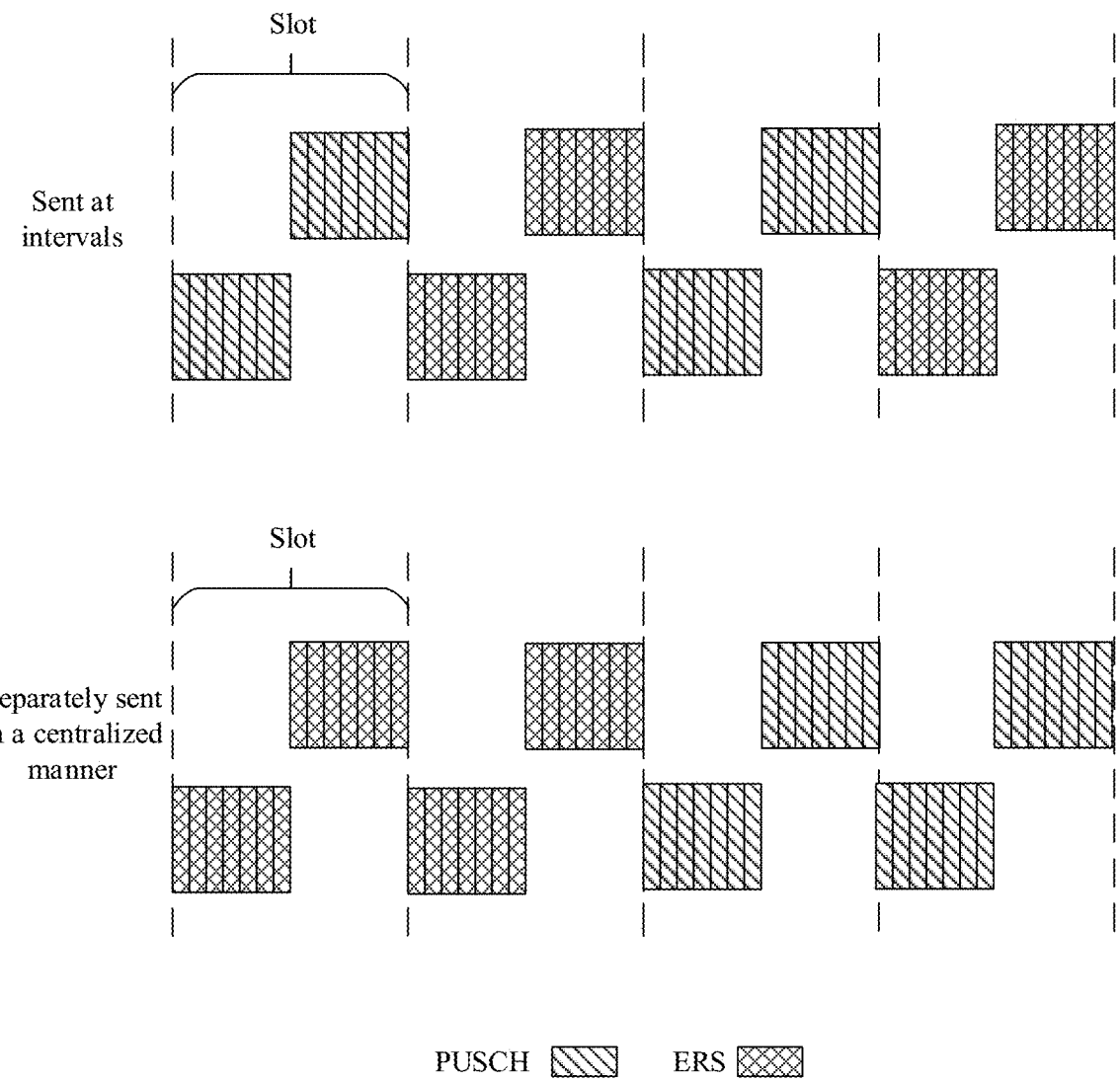
FIG. 14 is a schematic diagram of performing intra-time unit frequency hopping transmission on both a first reference signal and a first uplink signal according to this application.

In a possible design, intra-time unit frequency hopping transmission is performed on both the first reference signal and the first uplink signal. For example, intra-slot frequency hopping transmission is performed on both the first reference signal and the PUSCH in their respective slots. As shown in FIG. 14, a PUSCH and a first reference signal may be sent at intervals, or the first reference signal and the PUSCH may be separately sent in a centralized manner.

Figure 15:
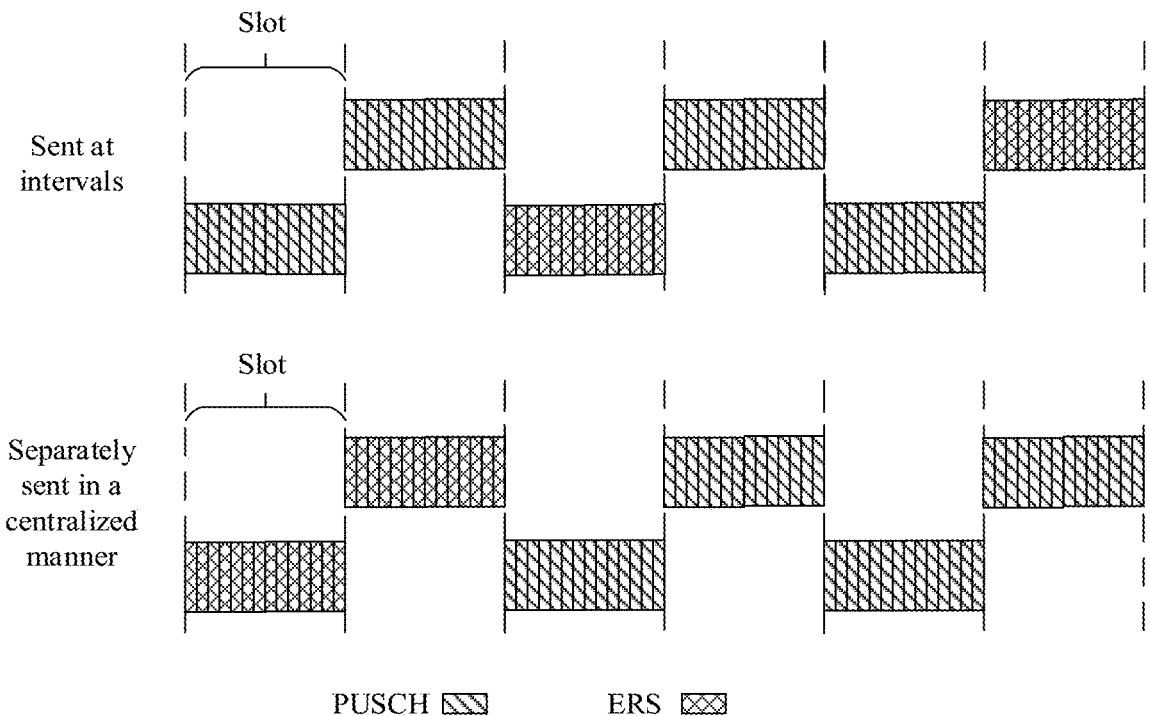
FIG. 15 is a first schematic diagram of performing inter-time unit frequency hopping transmission on both a first reference signal and a first uplink signal according to this application.

In a possible design, inter-time unit frequency hopping transmission is performed on both the first reference signal and the first uplink signal. For example, inter-slot frequency hopping transmission is performed on both the first reference signal and the PUSCH in their respective slots. As shown in FIG. 15, frequency hopping transmission is performed on the PUSCH and the first reference signal in the third transmission time period that includes the first transmission time period and the second transmission time period, and the PUSCH and the first reference signal may be sent at intervals, or the first reference signal and the PUSCH may be separately sent in a centralized manner.

In a possible design, frequency hopping transmission is performed on the first reference signal and the first uplink signal in the third transmission time period that includes the first transmission time period and the second transmission time period. If the quantity of time units included in the first transmission time period is equal to the quantity of time units included in the second transmission time period, that is, when X1=X2, N1=N2=K, where K is a positive integer greater than 1 and less than or equal to X1.

Specifically, all the time units included in the first transmission time period are before the time units included in the second transmission time period; all the time units included in the first transmission time period are after the time units included in the second transmission time period; or every 2*K time units include K consecutive time units included in the first transmission time period and K consecutive time units included in the second transmission time period.

Figure 16:
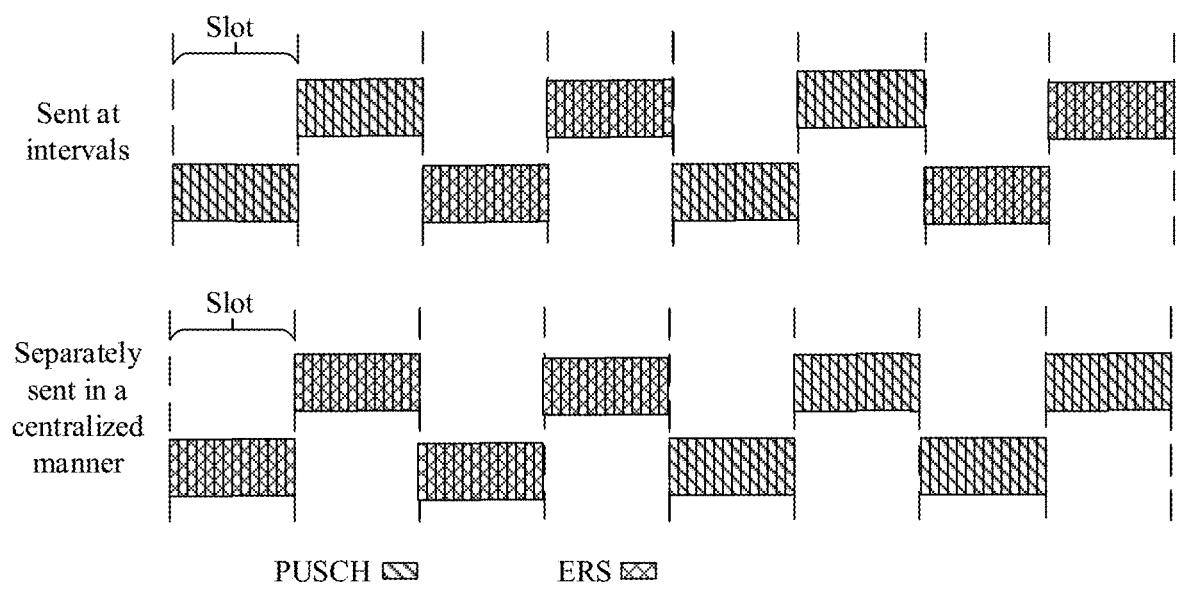
FIG. 16 is a second schematic diagram of performing inter-time unit frequency hopping transmission on both a first reference signal and a first uplink signal according to this application.

For example, when the ratio of the quantity $N_r$ of slots in which the first reference signal is located to the quantity $N_p$ of slots in which the PUSCH is located is r=1, inter-slot frequency hopping transmission is performed on both the first reference signal and the PUSCH, and frequency hopping transmission may be performed on the PUSCH and the first reference signal in $N_r+N_p$ slots. The PUSCH and the first reference signal may be separately sent in a centralized manner, or sent at an interval at a granularity of 2*Y slots, where every 2*Y slots include Y slots in which the first reference signal is located and Y slots in which the PUSCH is located, where Y is a positive integer greater than or equal to 2. This is shown in FIG. 16.

Figure 17:
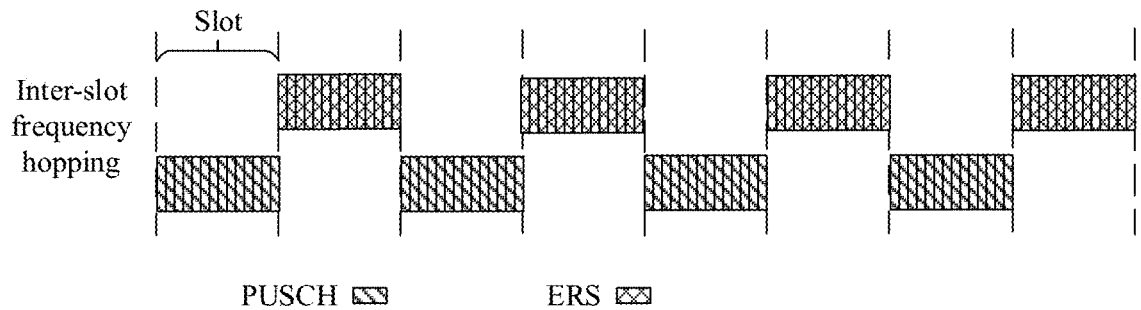
FIG. 17 is a third schematic diagram of performing inter-time unit frequency hopping transmission on both a first reference signal and a first uplink signal according to this application.

As shown in FIG. 17, if every two time units include one time unit included in the first transmission time period and one time unit included in the second transmission time period, and the quantity of time units included in the first transmission time period is equal to the quantity of time units included in the second transmission time period, a case in which a frequency location of the first reference signal cannot include a frequency location of the first uplink signal may occur. Therefore, channel estimation precision cannot be improved. According to the foregoing design, the foregoing case can be avoided, and the channel estimation precision may be improved.

In the foregoing embodiments provided in this application, various solutions of the communication method provided in the embodiments of this application are separately described from perspectives of each network element and interaction between the network elements. It may be understood that, to implement the foregoing functions, the network elements, such as the network device and the terminal device, include a corresponding hardware structure and/or software module for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 18:
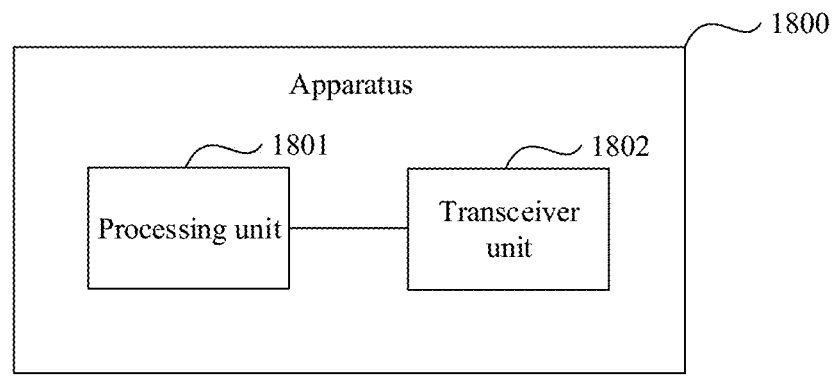
FIG. 18 is a first schematic diagram of a structure of an apparatus according to this application.

Same as the foregoing idea, as shown in FIG. 18, an embodiment of this application further provides an apparatus 1800. The apparatus 1800 includes a transceiver unit 1802 and a processing unit 1801.

In an example, the apparatus 1800 is configured to implement functions of the terminal device in the foregoing method. The apparatus may be a terminal device, or may be an apparatus in the terminal device.

The processing unit 1801 is configured to determine a first transmission time period and a second transmission time period, where the first transmission time period includes X1 time units, the second transmission time period includes X2 time units, and the first transmission time period does not overlap the second transmission time period, where X1 is a positive integer, and X2 is a positive integer.

The transceiver unit 1802 is configured to send a first reference signal in the first transmission time period and a first uplink signal in the second transmission time period, where the first uplink signal includes at least one of a PUSCH, a PUCCH, or a DMRS.

In an example, the apparatus 1800 is configured to implement functions of the network device in the foregoing method. The apparatus may be a network device, or may be an apparatus in the network device.

The processing unit 1801 is configured to determine a first transmission time period and a second transmission time period, where the first transmission time period includes X1 time units, the second transmission time period includes X2 time units, and the first transmission time period does not overlap the second transmission time period, where X1 is a positive integer, and X2 is a positive integer.

The transceiver unit 1802 is configured to receive a first reference signal in the first transmission time period and a first uplink signal in the second transmission time period, where the first uplink signal includes at least one of a PUSCH, a PUCCH, or a DMRS.

For specific execution processes of the processing unit 1801 and the transceiver unit 1802, refer to the description in the foregoing method embodiments. Division into modules in the embodiments of this application is an example, is merely logical function division, and may be other division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

In another optional variation, the apparatus may be a chip system. In the embodiments of this application, the chip system may include a chip, or may include a chip and another discrete device. For example, the apparatus includes a processor and an interface, and the interface may be an input/output interface. The processor implements functions of the processing unit 1801, and the interface implements functions of the transceiver unit 1802. The apparatus may further include a memory. The memory is configured to store a program that can be run on the processor. When the processor executes the program, the method in the embodiment shown in FIG. 3 is performed.

Figure 19:
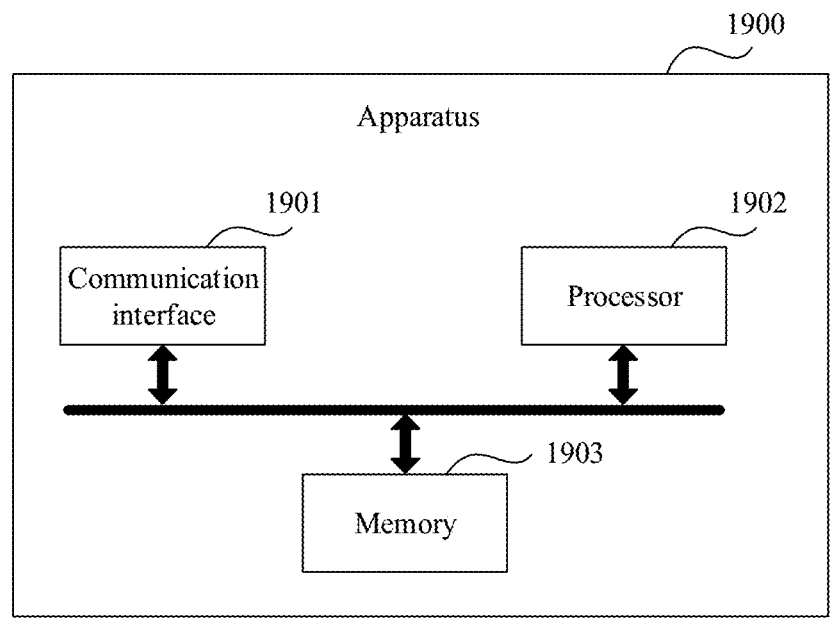
FIG. 19 is a second schematic diagram of a structure of an apparatus according to this application.

Same as the foregoing idea, as shown in FIG. 19, an embodiment of this application further provides an apparatus 1900. The apparatus 1900 includes a communication interface 1901, at least one processor 1902, and at least one memory 1903. The communication interface 1901 is configured to communicate with another device by using a transmission medium, so that an apparatus in the apparatus 1900 can communicate with the another device. The memory 1903 is configured to store a computer program. The processor 1902 invokes the computer program stored in the memory 1903, to send and receive data through the communication interface 1901, so that the method in the foregoing embodiments is implemented.

For example, when the apparatus is a network device, the memory 1903 is configured to store the computer program. The processor 1902 invokes the computer program stored in the memory 1903, to perform, through the communication interface 1901, the method performed by the network device in the foregoing embodiments. When the apparatus is a terminal device, the memory 1903 is configured to store the computer program. The processor 1902 invokes the computer program stored in the memory 1903, to perform, through the communication interface 1901, the method performed by the terminal device in the foregoing embodiments.

In this embodiment of this application, the communication interface 1901 may be a transceiver, a circuit, a bus, a module, or a communication interface of another type. The processor 1902 may be a general-purpose processor, a digital signal processor, an application-specific integrated circuit, a field programmable gate array or another programmable logic device, a discrete gate or transistor logic device, or a discrete hardware component. The processor 1902 may implement or perform the methods, steps, and logical block diagrams disclosed in the embodiments of this application. The general-purpose processor may be a microprocessor, any conventional processor, or the like. The steps in the methods disclosed with reference to the embodiments of this application may be directly performed by a hardware processor, or may be performed by using a combination of hardware in the processor and a software module. The memory 1903 may be a nonvolatile memory, for example, a hard disk drive (HDD) or a solid-state drive (SSD), or may be a volatile memory, for example, a random access memory (RAM). The memory is any other medium that can carry or store expected program code in a form of instructions or a data structure and that can be accessed by a computer, but is not limited thereto. The memory in this embodiment of this application may alternatively be a circuit or any other apparatus that can implement a storage function. The memory 1903 is coupled to the processor 1902. Coupling in the embodiments of this application may be indirect coupling or a communication connection between apparatuses, units, or modules in an electrical form, a mechanical form, or another form, and is used for information exchange between the apparatuses, the units, or the modules. In another implementation, the memory 1903 may alternatively be located outside the apparatus 1900. The processor 1902 may cooperate with the memory 1903 in performing an operation. The processor 1902 may execute program instructions stored in the memory 1903. At least one of the at least one memory 1903 may alternatively be included in the processor 1902. A specific connection medium among the communication interface 1901, the processor 1902 and the memory 1903 is not limited in this embodiment of this application. For example, in this embodiment of this application, the memory 1903, the processor 1902, and the communication interface 1901 may be connected via a bus in FIG. 19. The bus may be classified into an address bus, a data bus, a control bus, or the like.

It may be understood that the apparatus in the embodiment shown in FIG. 18 may be implemented by the apparatus 1900 shown in FIG. 19. Specifically, the processing unit 1801 may be implemented by the processor 1902, and the transceiver unit 1802 may be implemented by the communication interface 1901.

An embodiment of this application further provides a computer-readable storage medium. The computer-readable storage medium stores a computer program. When the computer program runs on a computer, the computer is enabled to perform the method according to the foregoing embodiments.

All or some of the methods provided in the embodiments of this application may be implemented by using software, hardware, firmware, or any combination thereof. When software is used to implement the embodiments, all or some of the embodiments may be implemented in a form of a computer program product. The computer program product includes one or more computer instructions. When computer instructions are loaded and executed on a computer, procedures or functions according to the embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, that integrates one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing embodiments are merely used to describe the technical solutions of this application in detail. The description of the foregoing embodiments is merely intended to help understand the method of the embodiments of the present disclosure, and shall not be construed as a limitation on the embodiments of the present disclosure. Variations or replacements readily figured out by a person skilled in the art shall fall within the protection scope of the embodiments of the present disclosure.

What is claimed is:

1. A communication method, comprising:
    determining, by a terminal device, a first transmission time period and a second transmission time period, wherein the first transmission time period comprises X1 time units, the second transmission time period comprises X2 time units, and the first transmission time period does not overlap the second transmission time period, wherein X1 is a positive integer, and X2 is a positive integer; and
    sending, by the terminal device, a first reference signal in the first transmission time period and a first uplink signal in the second transmission time period, wherein the first uplink signal comprises at least one of a physical uplink shared channel (PUSCH), a physical uplink control channel (PUCCH), or a demodulation reference signal (DMRS);
    wherein in the first transmission time period and the second transmission time period, each N1+N2 consecutive time units comprise N1 consecutive time units that are comprised in the first transmission time period and N2 consecutive time units that are comprised in the second transmission time period, wherein N1 is a positive integer less than or equal to X1, and N2 is a positive integer less than or equal to X2; and
    wherein N1 is a quotient of X1 divided by Z, N2 is a quotient of X2 divided by Z, and Z is a greatest common divisor of X1 and X2.

2. The method according to claim 1, wherein the determining, by the terminal device, the first transmission time period comprises:
    determining, by the terminal device, the first transmission time period based on first indication information, wherein:
        the first indication information indicates information about a ratio of a quantity of time units comprised in the first transmission time period to a quantity of time units comprised in the second transmission time period, or
        the first indication information indicates a quantity of time units comprised in the first transmission time period.

3. The method according to claim 2, wherein the determining, by the terminal device, the first transmission time period comprises:
    determining, by the terminal device, the first transmission time period based on the second transmission time period and the information that is indicated by the first indication information and that is about the ratio of the quantity of time units comprised in the first transmission time period to the quantity of time units comprised in the second transmission time period; or
    determining, by the terminal device, the first transmission time period based on the second transmission time period and the quantity that is indicated by the first indication information and that is of time units comprised in the first transmission time period.

4. The method according to claim 2, wherein the determining, by the terminal device, the first transmission time period comprises:
    determining, by the terminal device, the first transmission time period based on a third transmission time period and the information that is indicated by the first indication information and that is about the ratio of the quantity of time units comprised in the first transmission time period to the quantity of time units comprised in the second transmission time period; or
    determining, by the terminal device, the first transmission time period based on the third transmission time period and the quantity that is indicated by the first indication information and that is of time units comprised in the first transmission time period,
    wherein the third transmission time period comprises the first transmission time period and the second transmission time period.

5. A communication method, comprising:
    determining, by a network device, a first transmission time period and a second transmission time period, wherein the first transmission time period comprises X1 time units, the second transmission time period comprises X2 time units, and the first transmission time period does not overlap the second transmission time period, wherein X1 is a positive integer, and X2 is a positive integer; and
    receiving, by the network device, a first reference signal in the first transmission time period and a first uplink signal in the second transmission time period, wherein the first uplink signal comprises at least one of a physical uplink shared channel (PUSCH), a physical uplink control channel (PUCCH), or a demodulation reference signal (DMRS);
    wherein in the first transmission time period and the second transmission time period, each N1+N2 consecutive time units comprise N1 consecutive time units that are comprised in the first transmission time period and N2 consecutive time units that are comprised in the second transmission time period, wherein N1 is a positive integer less than or equal to X1, and N2 is a positive integer less than or equal to X2; and
    wherein N1 is a quotient of X1 divided by Z, N2 is a quotient of X2 divided by Z, and Z is a greatest common divisor of X1 and X2.

6. The method according to claim 5, further comprising:
    sending, by the network device, first indication information to a terminal device,
    wherein:
        the first indication information indicates information about a ratio of a quantity of time units comprised in the first transmission time period to a quantity of time units comprised in the second transmission time period, or
        the first indication information indicates a quantity of time units comprised in the first transmission time period.

7. The method according to claim 6, wherein a transmission mode of the terminal device is inter-time unit frequency hopping transmission, wherein X1=X2, wherein N1=N2=K, and wherein K is a positive integer greater than 1 and less than or equal to X1.

8. The method according to claim 5,
wherein an index of a start symbol in time domain symbols occupied by the first reference signal in a time unit comprised in the first transmission time period is the same as an index of a start symbol in time domain symbols occupied by the first uplink signal in a time unit comprised in the second transmission time period; and
wherein an index of an end symbol in the time domain symbols occupied by the first reference signal in the time unit comprised in the first transmission time period is the same as an index of an end symbol in the time domain symbols occupied by the first uplink signal in the time unit comprised in the second transmission time period.

9. A communication apparatus, comprising:
at least one processor; and
a memory storing programming instructions for execution by the at least one processor, the programming instructions instructing the communication apparatus to perform operations comprising:
determining a first transmission time period and a second transmission time period, wherein the first transmission time period comprises X1 time units, the second transmission time period comprises X2 time units, and the first transmission time period does not overlap the second transmission time period, wherein X1 is a positive integer, and X2 is a positive integer; and
sending a first reference signal in the first transmission time period and a first uplink signal in the second transmission time period, wherein the first uplink signal comprises at least one of a physical uplink shared channel (PUSCH), a physical uplink control channel (PUCCH), or a demodulation reference signal (DMRS);
wherein in the first transmission time period and the second transmission time period, each N1+N2 consecutive time units comprise N1 consecutive time units that are comprised in the first transmission time period and N2 consecutive time units that are comprised in the second transmission time period, wherein N1 is a positive integer less than or equal to X1, and N2 is a positive integer less than or equal to X2; and
wherein N1 is a quotient of X1 divided by Z, N2 is a quotient of X2 divided by Z, and Z is a greatest common divisor of X1 and X2.

10. The communication apparatus according to claim 9, wherein the determining the first transmission time period and the second transmission time period comprises:
determining the first transmission time period based on first indication information,
wherein:
the first indication information indicates information about a ratio of a quantity of time units comprised in the first transmission time period to a quantity of time units comprised in the second transmission time period, or
the first indication information indicates a quantity of time units comprised in the first transmission time period.

11. The communication apparatus according to claim 10, wherein the determining the first transmission time period and the second transmission time period comprises:

determining the first transmission time period based on the second transmission time period and the information that is indicated by the first indication information and that is about the ratio of the quantity of time units comprised in the first transmission time period to the quantity of time units comprised in the second transmission time period; or
determining the first transmission time period based on the second transmission time period and the quantity that is indicated by the first indication information and that is of time units comprised in the first transmission time period.

12. The communication apparatus according to claim 11, wherein the determining the first transmission time period and the second transmission time period comprises:
determining the first transmission time period based on a third transmission time period and the information that is indicated by the first indication information and that is about the ratio of the quantity of time units comprised in the first transmission time period to the quantity of time units comprised in the second transmission time period; or
determining the first transmission time period based on the third transmission time period and the quantity that is indicated by the first indication information and that is of time units comprised in the first transmission time period,
wherein the third transmission time period comprises the first transmission time period and the second transmission time period.

13. A communication apparatus, comprising:
at least one processor; and
a memory storing programming instructions for execution by the at least one processor, the programming instructions instructing the communication apparatus to perform operations comprising:
determining a first transmission time period and a second transmission time period, wherein the first transmission time period comprises X1 time units, the second transmission time period comprises X2 time units, and the first transmission time period does not overlap the second transmission time period, wherein X1 is a positive integer, and X2 is a positive integer; and
receiving a first reference signal in the first transmission time period and a first uplink signal in the second transmission time period, wherein the first uplink signal comprises at least one of a physical uplink shared channel (PUSCH), a physical uplink control channel (PUCCH), or a demodulation reference signal (DMRS);
wherein in the first transmission time period and the second transmission time period, each N1+N2 consecutive time units comprise N1 consecutive time units that are comprised in the first transmission time period and N2 consecutive time units that are comprised in the second transmission time period, wherein N1 is a positive integer less than or equal to X1, and N2 is a positive integer less than or equal to X2; and
wherein N1 is a quotient of X1 divided by Z, N2 is a quotient of X2 divided by Z, and Z is a greatest common divisor of X1 and X2.

14. The communication apparatus according to claim 13, wherein the operations further comprise:
sending first indication information to a terminal device, wherein:
the first indication information indicates information about a ratio of a quantity of time units comprised in the first transmission time period to a quantity of time units comprised in the second transmission time period, or
the first indication information indicates a quantity of time units comprised in the first transmission time period.

15. The communication apparatus according to claim 13, wherein an index of a start symbol in time domain symbols occupied by the first reference signal in a time unit comprised in the first transmission time period is the same as an index of a start symbol in time domain symbols occupied by the first uplink signal in a time unit comprised in the second transmission time period; and
wherein an index of an end symbol in the time domain symbols occupied by the first reference signal in the time unit comprised in the first transmission time period is the same as an index of an end symbol in the time domain symbols occupied by the first uplink signal in the time unit comprised in the second transmission time period.

16. The communication apparatus according to claim 13, wherein a frequency domain resource occupied by the first reference signal is the same as a frequency domain resource occupied by the first uplink signal; or
a frequency domain resource occupied by the first reference signal comprises a frequency domain resource occupied by the first uplink signal and a frequency domain resource of Y frequency domain units other than the frequency domain resource occupied by the first uplink signal, wherein Y is a positive integer.

17. The method according to claim 1, wherein a transmission mode of the terminal device is inter-time unit frequency hopping transmission, wherein $X1=X2$, wherein $N1=N2=K$, and wherein K is a positive integer greater than 1 and less than or equal to X1.

18. The communication apparatus according to claim 9, wherein a transmission mode of the communication apparatus is inter-time unit frequency hopping transmission, wherein $X1=X2$, wherein $N1=N2=K$, and wherein K is a positive integer greater than 1 and less than or equal to X1.

19. The communication apparatus according to claim 14, wherein a transmission mode of the terminal device is inter-time unit frequency hopping transmission, wherein $X1=X2$, wherein $N1=N2=K$, and wherein K is a positive integer greater than 1 and less than or equal to X1.

* * * * *